United States Patent Office 3,410,754
Patented Nov. 12, 1968

3,410,754
PRODUCTION OF 5'-NUCLEOTIDES
Einosuke Omura, Nishinomiya, Koichi Ogata, Minoo, Yukio Sugino, Kyoto, Seizi Igarasi, Ashiya, Masahiko Yoneda, Kobe, Yoshio Nakao, Ibaraki, and Ikuo Suhara, Takatsuki, Japan, assignors to Takeda Chemical Industries, Ltd., Osaka, Japan
No Drawing. Continuation-in-part of application Ser. No. 40,521, July 5, 1960. This application Sept. 17, 1965, Ser. No. 488,257
12 Claims. (Cl. 195—28)

ABSTRACT OF THE DISCLOSURE

5' - ribonucleotides and 5' - deoxyribonucleotides are prepared by the hydrolysis of ribonucleic acid or deoxyribonucleic acid, respectively, by means of phosphodiesterase, with the aid of a phosphodiesterase-producing enzyme system which is a metabolite of a microorganism of the order Sphaeriales.

---

This application is a continuation-in-part of copending application Ser. No. 40,521, filed July 5, 1960 and now abandoned, which is itself a continuation-in-part of application, Ser. No. 800,396, filed Mar. 19, 1959 now U.S. Patent 3,168,446.

Nucleic acids, which are widely distributed in living bodies as non-protein components in nucleoproteins and which have close relation to living phenomena, are essential components of living bodies and are constructed of various ribonucleotides and/or dexoyribonucleotides.

Of these nucleotides, the 5'-ribonucleotides and/or 5'-deoxyribonucleotides are compounds which are important as useful reagents for biological research. Moreover, they are now being used as seasoning material for foods, and as therapeutics or therapeutic intermediates.

In spite of the wide distribution of the 5'-nucleotides in natural sources as components of nucleic acids, the 5'-nucleotides have been regarded as compounds hardly obtainable in pure state, because there has been no suitable method for hydrolyzing ribonucleic acids into 5'-nucleotides, and therefore their use has been extremely limited up to the present.

Both chemical and biochemical processes are known for hydrolyzing ribonucleic acids. The chemical process, however, does not give 5'-nucleotides, but 2'- and/or 3'-nucleotides. And, as one of the biochemical processes, there has been known a process in which ribonucleic acids or hydrolytic products thereof are further hydrolyzed with phosphodiesterase from snake venoms or from a mucous membrane of bovine small intestines. This method, however, has such deficiencies as low yield of 5'-nucleotides and difficulty of obtaining the enzymes to be used. Therefore, this method is hardly applicable to an industrial production of 5'-nucleotides.

A primary object of the present invention is the embodiment of a practicable method for the production of 5'-riboncleotides or 5'-deoxyribonucleotides on an industrial scale. This object is realized according to the present invention by the hydrolysis of ribonucleic acid or deoxyribonucleic acid by means of phosphodiesterase, employing for this purpose certain phosphodiesterase-producing microorganisms, as such or in the form of the enzymes produced thereby, whereby the 5'-compounds are predominantly obtained.

In this specification, the term "phosphodiesterase" includes any enzyme not only capable of hydrolyzing ribonucleic acid at the 3'-position to produce 5-ribonucleotide, but also capable of hydrolyzing deoxyribonucleic acid at the 3'-position to produce 5'-deoxyribonucleotide.

Ribonucleic acids or deoxyribonucleic acids which can be used as the starting material of the method of this invention may be obtained from such natural sources as yeast, bacteria and animal tiisues. Unrefined ribonucleic acid- (or its 2'-deoxy-compound)-containaing substances such as aqueous yeast extracts may also be employed as starting material. Since these comprise, as is well known, adenylic acid, cytidylic acid, uridylic acid, guanylic acid, etc., the product in such case is a mixture of 5'-mononucleotides.

These mixtures as such have, of course, various uses as introductorily described, but, if necessary, each component may be separated, by per se known methods.

In that aspect of the invention which relates to the conversion of deoxyribonucleic acid to 5'-nucleotides, use can particularly be made of microorganisms belonging to order Fungi Imperfecti (e.g. genus Fusarium, genus Verticillium, genus Gliomastix, genus Helminthosporium), order Eubacteriales (e.g. genus Bacillus), order Actinomycetals (e.g. genus Streptomyces), order Sphaeriales (e.g. genus Anixiella, genus Botryosphaeria, genus Chaetomidium, genus Glomerella, genus Neurospora, genus Ophiobolus, genus Ophiostoma, genus Sordaria, genus Tilachlidium). These comprise:

*Fusarium roseum* Link,
*Fusarium solani* (Mart.) Appel et Wollenweber,
*Verticillium niveostratosum* Lindau,
*Gliomastix convoluta* (Harz.) Mason ver. felina (Marchal) Mason,
*Helminthosporium sigmoideum* var. irregulare Cralley et Tullis,
*Bacillus subtilis* Cohn emend. Prazmowski,
*Bacillus brevis* Migula emened. Ford,
*Streptomyces griseus* (Krainsky emend. Waksman et al.) Waksman et al.,
*Streptomyces coelicolor* (Müller) Waksman et Henrici,
*Streptomyces flavus* (Krainsky) Waksman et Henrici,
*Sterptomcyes lavendulae* (Waksman et Curtis) Waksman et Henrici,
*Streptomyces ruber* (Krainsky) Waksman et Henrici,
*Streptomyces viridochromogenes* (Krainsky) Waksman et Henrici,
*Streptomyces purpurescens* Lindenbeim,
*Streptomyces albogriseolus* Benedict et al.,
*Streptomyces olivochromogenus* (Bergey et al). Waksman et Henrici,
*Streptomyces aureous* (Waksman et Curtis) Waksman et Henrici,
*Streptomcyes gougeroti* (Duche) Waksman et Henrici,
*Streptomyces griseoflavus* (Krainsky) Waksman et Henrici.

Microorganisms belonging to order Sphaeriales (e.g. genus Anixiella, genus Botryosphaeria, genus Chaetomidium, genus Glomerella, genus Neurospora, genus Ophiostoma, genus Sordaria, genus Tilachlidium) are particularly useful for converting ribonucleic acid to 5'-nucleotides. Microorganisms which can be used in this aspect of the invention as well as in the first aspect are as follows, for example:

*Anixiella reticulispora* Saito et Minoura
*Botryosphaeria ribis chromogena* G. et D.
*Chaetomidium japonicum* Saito et Okazaki
*Glomerella cingulata* (Stonem.) Spauld. et v. Schr.
*Neurospora crassa* Shear et Dodge
*Neurospora sitophila* Shear et Dodge
*Ophiobolus miyabeanus* Ito et Kuribayashi
*Ophiostoma ulmi* (Buisman) Nannf.
*Sordaria fimicola* (Rab.) Cesari et de Notaris
*Tilachlidium humicola* Oudenans.

Strains of these microorganisms are all preserved at the

Institute for Fermentation, Osaka, Japan, and are all available therefrom, and they also are easily obtainable from such culture collections in various countries as American Type Culture Collection, Washington, D.C., Northern Utilization Research Branch of United States Department of Agriculture, Peoria, Ill., and Central bureau vóor Schimmelcultures, Baarn, Netherlands.

In the process of the present invention, the above exemplified microorganisms or phosphodiesterase produced thereby are subjected to a reaction with ribonucleic acids or with their 2'-deoxy-compounds. When the microorganisms are utilized, the hydrolysis of ribonucleic acid or its 2'-deoxy-compound is caused by the enzyme produced by the microorganisms. Therefore, the method of this invention may be regarded as a method for hydrolyzing ribonucleic acids or its 2'-deoxy-compound into 5'-nucleotides or 5'-deoxyribonucleotides by ribonucleases, deoxyribonuclease and phosphodiesterase, of the microorganisms.

As described above, these phosphodiesterases may be used in the form of a component in living mycelia or culture filtrate of the microorganisms, a suspension of their microbial cells, extracted enzymes, etc. The extracted enzymes may be used in a crude or pure state. To bring the phosphodiesterases in the living cells of the microorganism into contact with ribonucleic acids, it is desirable to incubate the microorganism on a nutrient medium containing the starting material or subsequently to add the starting material to the culture of the microorganisms. Incubation in the above cases may be conducted in a liquid or solid medium, and the medium may be stirred, with aeration, or may not be stirred at all. The most convenient and advantageous process, however, is so-called submerged culture with aeration and agitation.

When the method of the present invention is effected by a culture method, the most suitable medium is selected in accordance with the kind and nature of the microorganism used, but any of the culture media used for incubating ordinary microorganisms may be employed. That is, starch, dextrin, sucrose, lactose, maltose, glycerin, etc. may be employed as carbon source, and peptone, meat extract, yeast or its extract, soybean powder, cornsteep, gluten, urea, ammonium salts, nitrates, etc. may conveniently be employed as nitrogen source. If necessary, inorganic salts of such metals as magnesium, calcium, potassium, sodium and a trace of copper, iron, manganese, cobalt, etc. may be added. Or the incubation may be conducted on a medium containing a trade element, etc. In some cases, ribonucleic acid itself may be utilized as a nutrient source.

The reaction proceeds by contact between ribonucleic acid or its 2'-deoxy-compound and microorganisms or their enzyme system. When living cells of the microorganism are used, ribonucleic acid or its 2'-deoxy-compound may be added to the medium at any stage of the incubation, or the microorganism may be incubated on a medium containing the starting material. When the enzyme system of the microorganism is used, the culture filtrate or cell suspension of the microorganism, or the extracted enzyme thereof may be brought into contact with the starting material in the presence or absence of a convenient medium. If the culture filtrate or cell suspension is employed, a medium is in most cases unnecessary.

When a medium is used, water or an aqueous solvent serves for the purpose and the latter may be, for example, an aqueous solution of a salt such as a buffer solution. The concentration of the starting material in the medium, including culture filtrate or cell suspension, may suitably be over several percent.

The reaction is conducted at a pH most suitable for the exhibition of enzymatic activity even when the extracted enzyme is used, not to speak of the case when living cells are used. Such a pH may be nearly neutral, e.g. higher than 4 and lower than 10. The reaction temperature should not weaken the enzymatic activity too much and destroy the enzyme system. The temperature is more or less variable according to the kind of the microorganism used or other conditions, and may ordinarily be in the range between 30 and 50° C. The reaction time is also variable in accordance with such conditions as the kind of microorganisms, enzyme systems or medium, concentration of the material in medium, reaction temperature, etc., but the reaction must be continued until the objective compound is produced in the highest yield. The reaction conditions may preferably be adjusted so that 5 to 40 hours is required for producing the objective product in the highest yield.

In the method of this invention, an accelerator may be added to the reaction system to stimulate the enzyme activity. Such an agent is, for example, selected from salts of bivalent metals such as magnesium.

In most cases, however, phosphomonoesterase exists in the enzyme system of the microorganisms, and therefore the reaction does not stop at 5'-ribonucleotides but further proceeds to nucleosides. In such case, the product may be a mixture composed of nucleosides such as adenosine, guanosine, cytidine, uridine, inosine, xanthosine, etc. or deoxynucleosides derived therefrom.

Thus if 5'-ribonucleotides alone are desired, phosphomonoesterase must be removed from the enzyme system by a purification process, or the action of the phosphomonoesterase has to be obstructed. In order to obstruct the action of the phosphomonoesterase inhibitor may be added to the enzyme system. As such an agent there may be used compounds capable of inactivating or adsorbing phosphomonoesterase, such as phosphates, arsenates, cyanates, amino acids such as cystein and glutamic acid, ethylene-diamine tetraacetic acid, metal ions such as zinc ion and cupric ion, for instance. In a certain enzyme system, adenylic deaminase co-exists with phosphodiesterase, and deaminated compound of 5'-adenylic acid or 5'-deoxyadenylic acid may contaminate the product in such a case. Such reaction, however, may preferably be utilized for obtaining 5'-inosinic acid or 5'-deoxyinosinic acid which may be substantially isolated. Namely, the enzyme system capable of eliminating amino group of 5'-adenylic acid or 5'-deoxyadenylic acid is brought into contact with such nucleotides in a similar manner to the hydrolysis of ribonucleic acid, etc. with phosphodiesterase. Or, a crude hydrolyzate of ribonucleic acid, etc. with phosphodiesterase may be brought into contact with such an adenylic deaminase-containing enzyme system to convert the amino group-containing component of the hydrolyzate used into deamination product, i.e. 5'-inosinic acid or 5'-deoxyinosinic acid. In this case, components other than 5'-adenylic acid and 5'-deoxyadenylic acid, remaining in the original state without being affected at all, are collectible from the reaction mixture as well as the deamination products.

In the method of this invention, when the phosphomonoesterase activity of the enzyme system is considerably high, use of a phosphomonoesterase inhibitor gives a mixture chiefly consisting of 5'-ribonucleotides or 5'-deoxyribonucleotides, while non-use of the said inhibitor gives a mixture chiefly consisting of nucleosides. In both cases, some oligoribonucleotides or oligodeoxyribonucleotides are usually admixed with the desired product. Even when a phosphomonoesterase inhibitor is used, admixture in the product of nucleosides is sometimes unavoidable.

As is evident from the foregoing, the product may be obtained as a complex mixture comprising various kinds of compounds, and therefore it is convenient that the reaction be terminated at the time when the concentration of the objective compound in the reaction mixture is the highest, the progress of the hydrolysis being traced by measuring the concentration. The measurement of the concentration may be conducted utilizing a known method such e.g. as an enzymatic process, paper-electrophoresis and paper-chromatography.

From the mixture thus produced which contains chiefly

5'-nucleotides and/or nucleosides or their 2'-deoxy-compounds, the objective substances can be isolated, respectively, or obtained as their mixture, utilizing differences in physico-chemical properties between impurities and the objective substances. Differences in solubility, distribution coefficient between the solvents, absorbability, dialysability, precipitability, etc. are physico-chemical properties to be utilized for the purpose. Or, a precipitation supplement may be added for the same purpose. The 5'-ribonucleotides or 5'-deoxyribonucleotides may conveniently be isolated as their organic or inorganic salts, for instance, as salts with barium, calcium, potassium, ammonium, amino acids, cyclohexylamine, and brucine.

The process for separating and purifying each component of the mixture may be conducted through a method which is known itself, such as chromatography. An example of the method is concretely explained hereunder:

Insoluble impurities are first removed from the mixture by filtration, then the active substances are adsorbed on an activated charcoal. The adsorbed substances are eluted with a convenient solvent such as dilute hydrochloric acid, dilute ammonia or alcohol. Then the ultraviolet absorption of each fraction is measured, and each fraction containing a component is collected and concentrated. If the product is collected as its barium salt, the subsequent purification can be conducted more conveniently.

The above process is an example of column chromatography on activated charcoal, and the other processes such as ion-exchange chromatography on ion-exchanger or counter-current distribution process can also be utilized for the same purpose.

5'-nucleotides, nucleosides and their 2'-deoxy-compounds produced by the method of this invention are useful compounds as reagents of biochemical researchers or therapeutics or their intermediates. Besides these utilities, the former compounds have another utility, which is regarded to be one of the most important utilities of the compounds, in enhancing natural flavors of foods after the manner of monosodium glutamate.

The following examples are illustrations of presently preferred embodiments of the invention, but they are not intended to limit the scope of this invention. In the examples, the temperatures are all in degrees centigrade and are all uncorrected, and the percentages are all in weight percent; and the abbreviations AMP, GMP, UMP, CMP and IMP mean adenosine monophosphate, guanosine monophosphate, uridine monophosphate, cytidine monophosphate and inosine monophosphate, respectively, the nucleic acid used for the starting materials of the examples is that produced from yeast in conventional manner, except when otherwise noted. The names of culture collections abbreviated as IFO, NRRL, ATCC and CBS are Institute for Fermentation, Osaka, Japan, Northern Utilization Research Branch of U.S. Department of Agriculture, Peoria, Ill., American Type Culture Collection, Washington, D.C., U.S.A., and Centraalbureau voor Schimmelcultures, Baarn, Netherlands, respectively.

In each of the following examples, unless otherwise noted, ribonucleic acid, as the starting material is prepared by a known process from bakery yeast, but ribonucleic acid produced from other sources such as brewery yeast and animal tissues of course give similar results as in the following illustrations. Deoxy compound can be similarly employed as will hereinafter appear.

EXAMPLE 1

A strain of *Anixiella reticulispora* Saito et Minoura is inoculated on an aqueous medium composed of 20% of fresh potato (mashed), 1.0% of yeast extract, 1.0% of peptone, 2.0% of glucose and 1.0% of sucrose, and is incubated for 5 days at 28° under shaking. In 3 liters of this culture filtrate is dissolved 150 grams of ribonucleic acid. The mixture is allowed to stand at 37° for 18 hours, keeping the pH at 7.5—8.0. From the reaction mixture are collected 5'-AMP, 5'-GMP, 5'-CMP and 5'-UMP whose yields are 15 grams, 18 grams, 13 grams and 14 grams, respectively. A part of remainder can be collected as nucleosides, the other part as oligonucleotides.

The strain of *Anixiella reticulispora* used in this example is deposited at IFO as well as at ITCC, and the respective accession numbers are IFO–5483 and ATCC–13828.

EXAMPLE 2

A strain of *Botryosphaeria ribis chromogena* G. et D. is incubated for 5 days at 28° on an aqueous medium composed of 5.0% of glucose, 1.0% of peptone, 0.1% of ammonium phosphate, 0.05% of magnesium sulfate, 0.2% of potassium nitrate and 0.01% of potassium chloride. In 10 liters of the filtrate of this culture is dissolved 100 grams of ribonucleic acid. After the addition of sodium arsenate at a concentration of $6 \times 10^{-3}$ mole per liter, the mixture is kept standing for 24 hours at 37°, keeping the pH at 7.8 to 8.0. From the reaction mixture are obtained 5'-AMP, 5'-GMP, 5'-CMP and 5'-UMP, the respective yields of which are 10 grams, 8 grams, 7 grams and 8 grams.

The strain of *Botryosphaeria ribis chromogena* used in this example is deposited at IFO and ATCC, and the respective accession numbers are IFO–4837 and ATCC–13834.

EXAMPLE 3

A strain of *Chaetomidium japonicum* Saito et Okazaki is aerobically incubated at 28° on 5 liters of an aqueous medium having the same composition as in Example 2 under agitation in a tank. In 100 liters of a filtrate of this culture is dissolved 1.5 kilograms of ribonucleic acid. After the addition of sodium arsenate at a concentration of $6 \times 10^{-3}$ mole per liter, the mixture is allowed to stand at 37° for 24 hours, keeping the pH from 7.5 to 8.0. From the reaction mixture are collected 5'-AMP, 5'-GMP, 5'-CMP and 5'-UMP, the respective yields of which are 180 grams, 140 grams, 120 grams and 130 grams.

The strain of *Chaetomidium japonicum* used in this example is deposited at IFO and ATCC under the respective accession numbers IFO–4451 and ATCC–13835.

EXAMPLE 4

A strain of *Glomerella cingulata* (Stonem.) Spauld et v. Schur, is incubated under shaking at 28% for 5 days on an aqueous medium composed of 5.0% of glucose, 2.0% of soybean powder, 0.1% of ammonium phosphate, 0.05% of magnesium sulfate, 0.2% of potassium nitrate and 0.01% of potassium chloride. To 1 liter of the filtrate of this culture is added 50 grams of ribonucleic acid, and then there is further added sodium arsenate in a concentration of $6 \times 10^{-3}$ mole per liter. Keeping the pH from 7.5 to 8.0, the mixture is allowed to stand for 24 hours at 37°. From the reaction mixture are collected 5'-AMP, 5'-GMP, 5'-CMP and 5'-UMP, the respective yields of which are 6 grams, 5 grams, 4.5 grams and 4.5 grams.

The strain of *Glomerella cingulata* has been deposited at IFO and ATCC, the respective accession numbers are IFO–5907 and ATCC–13836.

EXAMPLE 5

A strain of *Neurospora crassa* Shear et Dodge is aerobically incubated in a tank at 28° for 72 hours under agitation on an aqueous medium which contains 4.0% of starch, 1.0% of peptone, 1.0% of meat extract, 0.2% of yeast extract, 0.05% of magnesium sulfate and 0.2% of sodium chloride. In 100 liters of a filtrate of this culture is dissolved 1.5 kilograms of ribonucleic acid. After the addition of sodium arsenate at a concentration of $6 \times 10^{-3}$ mole per liter, the mixture is left standing for 24 hours at 37°, keeping the pH between 7.5 and 8.0. From the reaction mixture are collected 5'-AMP, 5'-GMP, 5'-CMP and 5'-UMP, the respective yields of which are 110 grams, 80 grams, 95 grams and 95 grams.

The strain of *Neurospora crassa* employed in this example has been deposited at IFO and ATCC, and the respective accession numbers are IFO–6067 and ATCC–13837.

EXAMPLE 6

A strain of *Ophiobolus miyabeanus* Ito et Kuribayashi, IFO–4870 (ATCC–13839) is employed instead of the strain of *Botryosphaeria ribis chromogenus* in Example 2, and the hydrolysis is effected after the same manner as in Example 2 to obtain 5'-AMP, 5'-GMP, 5'-CMP and 5'-UMP, the respective yields of which are 105 grams, 80 grams, 90 grams and 90 grams.

EXAMPLE 7

On an aqueous medium whose components are 5.0% of glucose, 0.5% of peptone, 0.5% of meat extract, 0.5% of soybean powder, 0.05% of magnesium sulfate, 0.01% of potassium chloride, 0.2% of potassium nitrate and 0.2% of yeast extract is incubated a strain of *Ophiostoma ulmi* (Buisman) Nannf. which has been deposited at IFO and ATCC under the accession number IFO–6128 and ATCC–13840, respectively, at 28° for 5 days under agitation. In 500 milliliters of a filtrate of this culture is dissolved 5 grams of ribonucleic acid and sodium arsenate is added in a concentration of $6 \times 10^{-3}$ mole per liter. The mixture is left standing at 37° for 24 hours, keeping the pH between 7.5 and 8.0 to produce 5'-AMP, 5'-GMP, 5'-CMP and 5'-UMP, the respective yields of which are 0.5 gram, 0.4 gram, 0.3 gram and 0.4 gram.

EXAMPLE 8

On an aqueous medium whose composition is the same as that employed in Example 4 is inoculated a strain of *Sordaria fimicola* (Rab.) Cesari et de Notaris for 5 days at 28° under agitation. In 100 milliliters of a filtrate of this culture is dissolved 5 grams of ribonucleic acid and the solution is allowed to stand, keeping the pH between 7.5 and 8.0 for 24 hours at 37° under the addition of sodium arsenate in a concentration of $6 \times 10^{-3}$ mole per liter. From the reaction mixture are collected 5'-AMP, 5'-GMP, 5'-CMP and 5'-UMP, the respective yields of which are 0.5 gram, 0.6 gram, 0.35 gram and 0.4 gram.

The strain of *Sordaria fimicola* used in this example has been filed at IFO and ATCC under the respective accession numbers IFO–4846 and ATCC–13841.

EXAMPLE 9

A strain of *Tilachlidium humicola* Oudenans is incubated for five days at 28° on an aqueous medium employed in Example 4. Ribonucleic acid is hydrolyzed after a similar manner to Example 7 to obtain 5'-AMP, 5'-GMP, 5'-CMP and 5'-UMP, the respective yields of which are 0.5 gram, 0.45 gram, 0.35 gram and 0.4 gram.

The strain *Tilachlidium humicola* used in this example has been deposited at IFO and ATCC, and the respective accession numbers are IFO–5696 and ATCC–13842.

When, in the preceding examples, the ribonucleic acid is replaced by deoxyribonucleic acid (prepared from thymus gland of calves, higher polymer), there are obtained from the reactive mixture 0.2 gram of 5'-deoxyadenylic acid, 0.2 gram of deoxyguanylic acid, 0.3 gram of deoxythymidinic acid and 0.15 gram of deoxycytidylic acid per 2 grams of deoxyribonucleic acid.

Having thus disclosed the invention, what is claimed is:

1. In a process for the microbiological degradative hydrolysis of ribonucleic acid to 5'-nucleotides by the action on the former of a phosphodiesterase-containing enzyme system produced from a microorganism, the improvement according to which the enzyme system is a metabolite of a microorganism of the order Sphaeriales.

2. In a process for the microbiological degradative hydrolysis of ribonucleic acid to 5'-nucleotides by the action on the former of a phosphodiesterase-containing enzyme system produced from a microorganism, the improvement according to which the enzyme system is a metabolite of a microorganism of the order Sphaeriales and is contained in the filtered culture medium in which said microorganism has been cultured and into which the ribonucleic acid is introduced.

3. The improvement according to claim 2, wherein the microorganism is *Anixiella recticulispora* Saito et Minoura.

4. The improvement according to claim 2, wherein the microorganism is *Botryosphaeria ribis chromogena* G. et D.

5. The improvement according to claim 2, wherein the microorganism is *Chaetomidium japonicum* et Okazaki.

6. The improvement according to claim 2, wherein the microorganism is *Glomeralla cingulata* (Stonem.) Spauld. et v. Schr.

7. The improvement according to claim 2, wherein the microorganism is *Neurospora crassa* Shear et Dodge.

8. The improvement according to claim 2, wherein the microorganism is *Neurospora sitophila* Shear et Dodge.

9. The improvement according to claim 2, wherein the microorganism is *Ophiobolus miyabeanus* Ito et Kuribayashi.

10. The improvement according to claim 2, wherein the microorganism is *Ophiostoma ulmi* (Buisman) Nannf.

11. The improvement according to claim 2, wherein the microorganism is *Sordaria fimicola* (Reb.) Cesari et de Notaris.

12. The improvement according to claim 2, wherein the microorganism is *Tilachlidium humicola* Oudenans.

References Cited

UNITED STATES PATENTS 3,223,592   12/1965   Sakaguchi et al. _____ 195—28

OTHER REFERENCES

Lehman: J. Biol. Chem., vol. 235, No. 5, pp. 1479 to 1487, May 1960.

Potter et al.: J. Biol. Chem., vol. 234, No. 5, pp. 1263 to 1267.

ALVIN E. TANENHOLTZ, *Primary Examiner.*

UNITED STATES PATENT OFFICE
CERTIFICATE OF CORRECTION

Patent No. 3,410,763 November 12, 1968

Italo A. Capuano

It is certified that error appears in the above identified patent and that said Letters Patent are hereby corrected as shown below:

Column 8, between lines 6 and 7 insert -- ing mercury aggregating from said drops from said --.

Signed and sealed this 10th day of March 1970.

(SEAL)
Attest:

Edward M. Fletcher, Jr.            WILLIAM E. SCHUYLER, JR.
Attesting Officer                          Commissioner of Patents